(12) United States Patent
Cavin et al.

(10) Patent No.: US 10,585,477 B1
(45) Date of Patent: Mar. 10, 2020

(54) PATTERNED OPTICAL FILTER FOR EYE TRACKING

(71) Applicant: Facebook Technologies, LLC, Menlo Park, CA (US)

(72) Inventors: Robert Dale Cavin, Kirkland, WA (US); Alexander Jobe Fix, Seattle, WA (US); Andrew John Ouderkirk, Redmond, WA (US); Qi Zhang, Bellevue, WA (US); Robin Sharma, Redmond, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 195 days.

(21) Appl. No.: 15/946,650

(22) Filed: Apr. 5, 2018

(51) Int. Cl.
*G06F 3/01* (2006.01)
*G02B 27/01* (2006.01)
*G06T 7/70* (2017.01)

(52) U.S. Cl.
CPC ......... *G06F 3/013* (2013.01); *G02B 27/0172* (2013.01); *G02B 27/0179* (2013.01); *G06T 7/70* (2017.01); *G02B 2027/014* (2013.01); *G02B 2027/0138* (2013.01); *G02B 2027/0187* (2013.01); *G06T 2207/10004* (2013.01); *G06T 2207/10048* (2013.01)

(58) Field of Classification Search
CPC ................ G06F 3/013; G02B 27/0179; G02B 2027/014; G02B 2027/0187; G06T 2207/10004
USPC ................................... 348/342; 359/359–360
See application file for complete search history.

(56) References Cited

U.S. PATENT DOCUMENTS

| | | | |
|---|---|---|---|
| 2013/0175449 A1* | 7/2013 | Favier | G01J 5/0862 250/339.02 |
| 2017/0176749 A1* | 6/2017 | Ouderkirk | G02B 5/3083 |
| 2018/0350070 A1* | 12/2018 | Ishii | G06T 7/0012 |
| 2019/0068853 A1* | 2/2019 | Price | G06T 7/521 |
| 2019/0258062 A1* | 8/2019 | Aleem | G06F 3/013 |
| 2019/0271860 A1* | 9/2019 | Maggi | G02C 7/102 |

OTHER PUBLICATIONS

"How do Tobii Eye Trackers Work?" Tobii AB, 2018, 2 pages, May be Retrieved at<URL:https://www.tobiipro.com/learn-and-support/learn/eye-tracking-essentials/how-do-tobii-eye-trackers-work/>.
"CHIPLED® with High Power Infrared Emitter (850 nm) Version 1.3," OSRAM Opto Semiconductors, Mar. 4, 2016, 13 pages, May be Retrieved at<URL:https://web.archive.org/web/20170309060552/http://www.osram-os.com/Graphics/XPic5/00209103_0.pdf>.

* cited by examiner

*Primary Examiner* — Bryan Earles
(74) *Attorney, Agent, or Firm* — Fenwick & West LLP

(57) ABSTRACT

An eyewear device has an optical element, a patterned optical filter, and a camera. The optical element receives light that includes light in a visible band and light in an infrared (IR) band. The patterned optical filter is disposed on the optical element and has a filtering portion and a plurality of non-filtering portions. The filtering portion is transmissive to light in the visible band and filtering of light in the IR band. The non-filtering portions are transmissive to light in the visible band and transmissive to light in the IR band. Some portion of the received light in the IR band passes through the non-filtering portions and illuminates a portion of an eye of a user with a pattern. The camera captures images of the portion of the eye that is illuminated with the pattern.

23 Claims, 7 Drawing Sheets

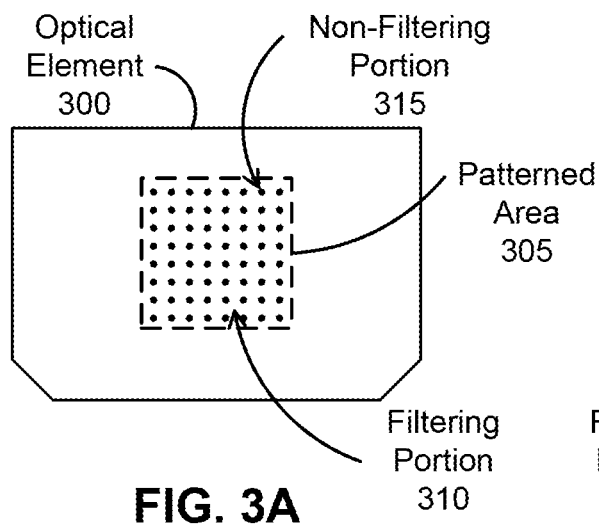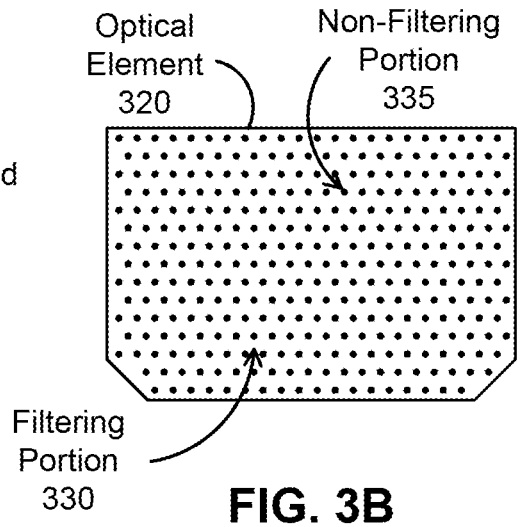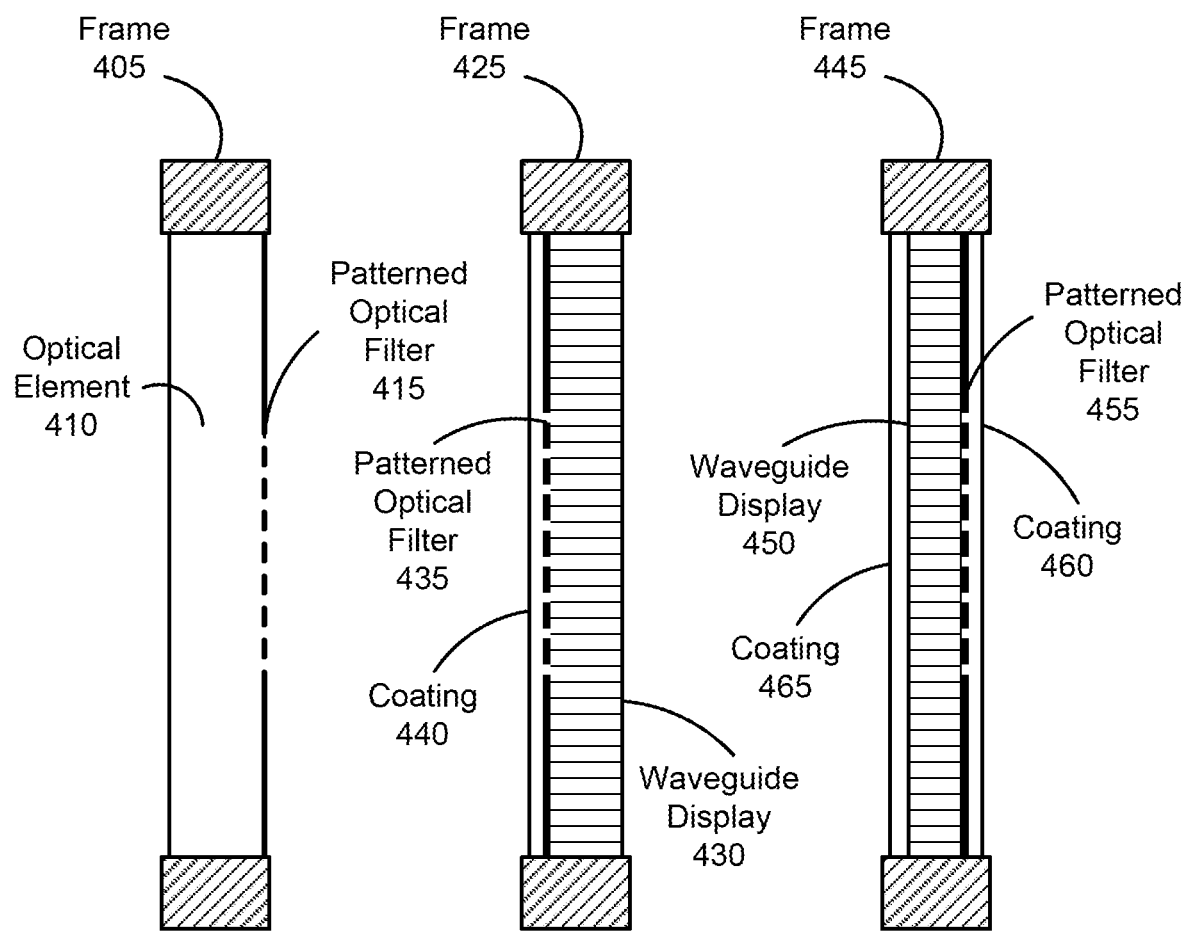

PATTERNED OPTICAL FILTER FOR EYE TRACKING

BACKGROUND

The present disclosure generally relates to eye tracking, and specifically relates to an eye tracker that can use light patterns obtained from ambient light or infrared light sources.

Eye tracking refers to the process of detecting the direction of a user's gaze, which may comprise detecting an orientation of an eye in 3-dimensional (3D) space. Eye tracking in the context of headsets used in, e.g., virtual reality and/or augmented reality applications can be an important feature. Conventional systems commonly use a small number of light sources that emit light which is reflected by the eye, and a camera is used to image the reflection of the light sources from the eye. An orientation of the eye is determined using the captured images. However, the small number of light sources results in a limited model of the eye with a lot of inaccuracies. In addition, the light sources used in conventional systems have high power consumption; for example, an array of eight LEDs can consume more than 0.1 Watt or more. Light sources added to achieve more accurate eye tracking can quickly exceed the power budget allotted to the eye tracking subsystem.

SUMMARY

An eye tracking system tracks one or both eyes of a user. The eye tracking system can determine the direction of the user's gaze by analyzing one or more images showing a reflection of light from a portion of an eye (e.g., the cornea). The accuracy of eye tracking can be improved by using a structured light pattern to illuminate a portion of the eye. However, it is challenging to embed structured light emitters into near-eye displays, such as compact augmented reality (AR) devices. To form light patterns in a near-eye display, the optical element (e.g., a lens or waveguide display) can include a patterned optical filter that is patterned with holes, the holes creating a pattern that illuminates the eye. The holes in the patterned optical filter transmit both visible light and non-visible light that is used for eye tracking (e.g., infrared light), and the filtering portion of the optical filter transmits visible light but absorbs or reflects non-visible light. The patterned optical filter is substantially transparent to visible light. The patterned optical filter blocks some of the non-visible light, creating a pattern of non-visible light on the user's eye. In particular, in a near-eye display that includes the patterned optical filter, the pattern of non-filtering holes transmits infrared wavelengths of ambient light from a source outside the near-eye display (e.g., sunlight) creating a desired light pattern on a portion of the eye. The light pattern can be used for accurate eye tracking.

In some embodiments, an eyewear device is described herein. The eyewear device includes an optical element, a patterned optical filter, and a camera. The optical element receives light that includes visible light and light in an invisible band, e.g., infrared light. The patterned optical filter is disposed on the optical element; for example, the patterned optical filter may be coupled to a surface of the optical element, or embedded into the optical element. The patterned optical filter has a filtering portion and a plurality of non-filtering portions. The filtering portion is transmissive to light in the visible band and reflective or absorptive of light in the IR band, and the plurality of non-filtering portions are transmissive to light in the visible band and transmissive to light in the IR band. The optical filter causes some portion of the received light in the IR band to pass through the plurality of non-filtering portions and illuminate a portion of an eye of a user with a portion of a pattern; the pattern is formed by the portion of the received light in the IR band that passes through the plurality of non-filtering portions. The camera is configured to capture one or more images of the portion of the eye illuminated with the portion of the pattern.

BRIEF DESCRIPTION OF THE DRAWINGS

FIG. 3A is a front view of an optical element with a patterned optical filter on a portion of the optical element, in accordance with an embodiment.

FIG. 3B is a front view of an optical element with a patterned optical filter across the full optical element, in accordance with an embodiment.

FIG. 4A is a cross section of an optical element with a surface patterned optical filter, in accordance with an embodiment.

FIG. 4B is a cross section of an optical element with a waveguide display and a patterned optical filter, in accordance with an embodiment.

FIG. 4C is a cross section of another optical element with a waveguide display and a patterned optical filter, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
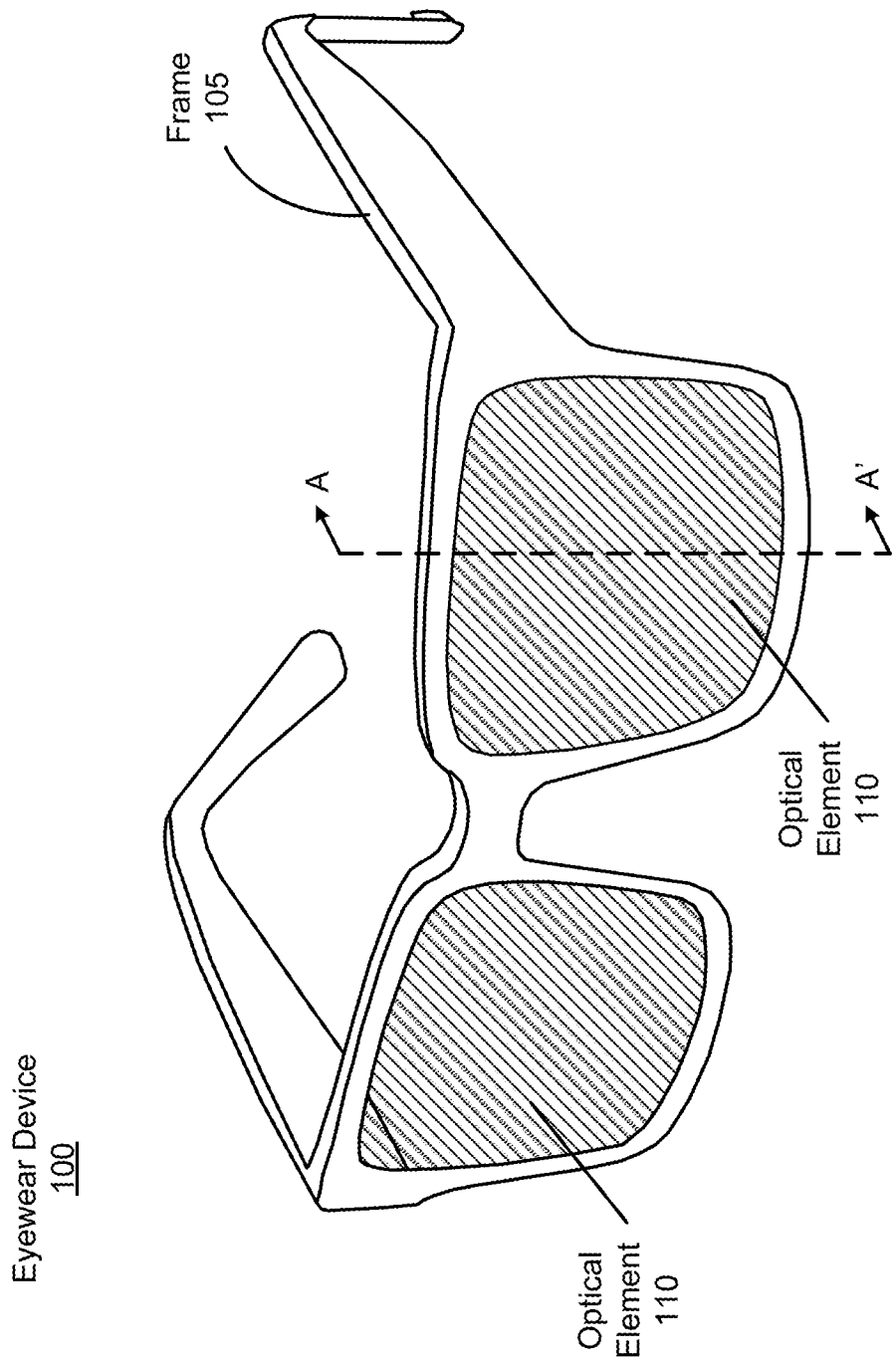
FIG. 1 is a diagram of an eyewear device, in accordance with an embodiment.

FIG. 1 is a diagram of an eyewear device 100, in accordance with an embodiment. In some embodiments, the eyewear device 100 is a near-eye-display for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 may be configured to operate as an artificial reality near-eye display (NED). In some embodiments, the eyewear device 100 may augment views of a physical, real-world environment with computer-generated elements (e.g., images, video, sound, etc.).

In other embodiments, the eyewear device 100 does not present media or information to a user. For example, the eyewear device 100 may be used in conjunction with a separate display. In other embodiments, the eyewear device 100 may be used for various research purposes, training applications, biometrics applications (e.g., fatigue or stress detection), automotive applications, communications systems for the disabled, or any other application in which eye tracking can be used.

The eyewear device 100 shown in FIG. 1 includes a frame 105 and two optical elements 110 held in the frame 105. In some embodiments, the frame 105 represents a frame of eye-wear glasses. The optical elements 110 may be configured for users to see content presented by the eyewear device 100. For example, the optical elements 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Some examples of waveguide displays are described in detail in U.S. patent application Ser. No. 15/495,373, incorporated herein by references in its entirety. Other types of displays may be used. For example, the optical elements 110 may include curved combiners with scanners, or holographic combiners.

In some embodiments, the optical element 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical element 110 may include one or more additional layers or coatings, such as protective coatings, or coatings for providing any of the aforementioned lens functions. In some embodiments, the optical element 110 may include a combination of one or more waveguide display assemblies, other types of display assemblies, one or more lenses, and/or one or more other layers or coatings.

The optical elements 110 also include a patterned optical filter for forming a pattern of light on the users' eyes. The optical filter may be made of any material that transmits light in a first band (e.g., a visible band) and blocks (e.g., by reflecting and/or absorbing) light in a second band (e.g., an infrared band). For example, the optical filter may be a dichroic mirror that reflects light a selected band, e.g., an infrared band. The optical filter may be a shortwave pass (SWP) filter. In other examples, the optical filter may be a metal dielectric multilayer coating, a low emissivity (low-E) coating (e.g., a transparent conductive oxide-based material), or an infrared absorbing dye or pigment. The portions of the filter forming the pattern, which may be circular holes, lines, or some other geometry, are transmissive in both the first band and the second band. The pattern formed on the users' eyes is formed by light in the second band, which is transmitted by the patterned optical filter with the pattern. The patterned optical filter, and performing eye tracking using a patterned optical filter, are described in detail below.

Figure 2A:
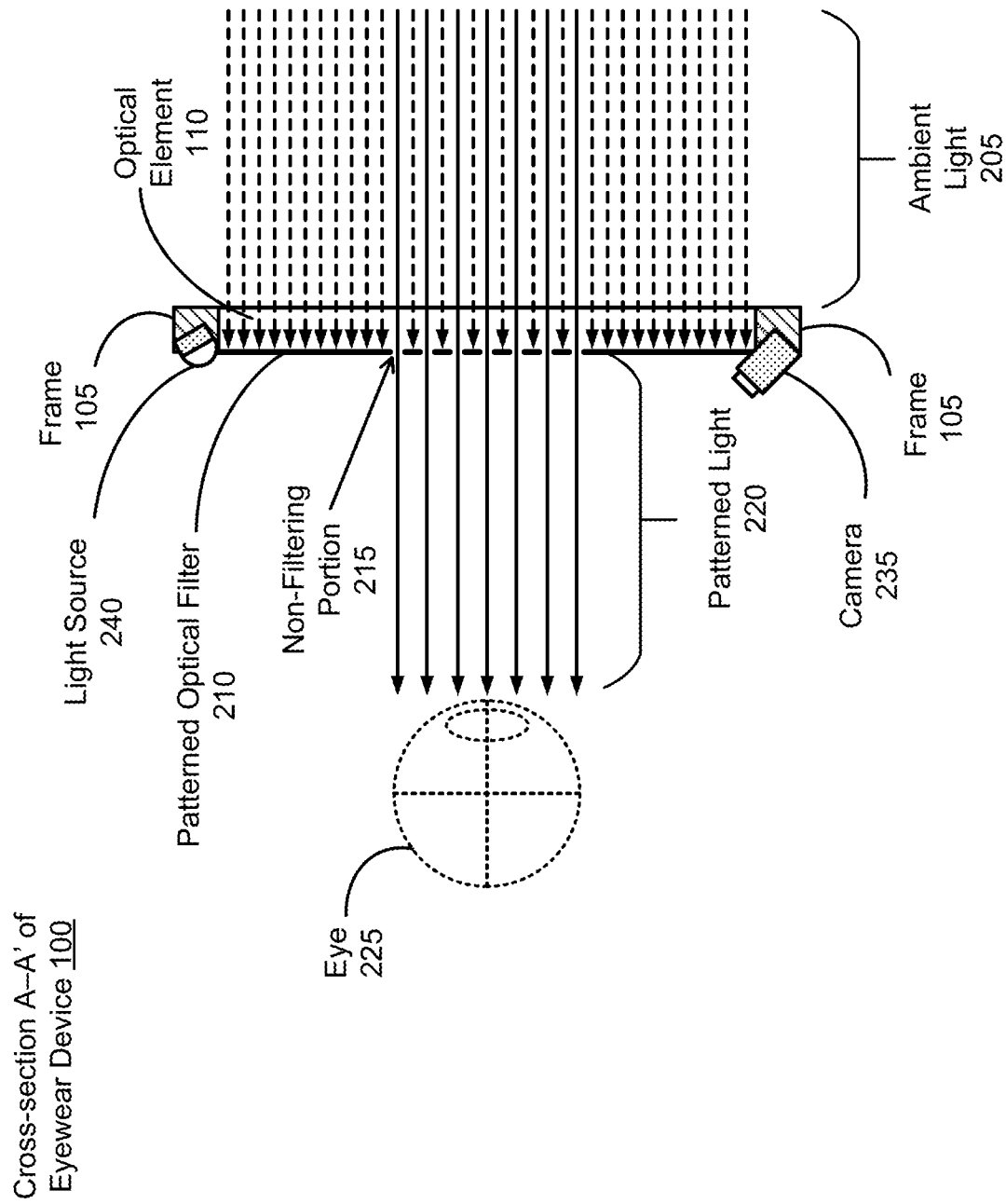
FIG. 2A is a cross section of the eyewear device of FIG. 1 with an optical filter for projecting a first pattern, in accordance with an embodiment.

FIG. 2A is cross-section A-A' of the eyewear device 100 illustrated in FIG. 1, in accordance with an embodiment. The optical element 110 is housed in the frame 105. Ambient light 205 is directed at the optical element 110 from an external source. The ambient light 205 may be sunlight, ambient artificial lighting, or some combination thereof. As shown in FIG. 2A, the ambient light may be direct, collimated light, e.g., if the user is oriented facing the sun. In other embodiments, the light may be diffuse, non-collimated light (e.g., if the user facing away from the sun). In some embodiments, ambient light 205 may be an external light source specifically designed for use with the eyewear device 100. While FIG. 2A shows paths of ambient light 205 that are directed at the eyewear device 100 (e.g., as collimated light), the ambient light 205 may travel in other directions, and at least a portion of the ambient light 205 may reach the optical element 110 from other angles not shown in FIG. 2A.

The optical element 110 includes a patterned optical filter 210 on the back surface of the optical element 110, i.e., the surface that is closest to a user's eye 225. The patterned optical filter 210 includes one or more filtering portions and multiple non-filtering portions 215, which are holes in the patterned optical filter 210. The filtering portion of the patterned optical filter 210 is an optical filter that transmits light in a first, visible band (around 390 to 700 nm) and filters light in a second, non-visible band, e.g., an infrared (IR) band (~750 nm to 2500 nm, or a portion of this band). The filtering portions may not fully block or reflect light in a filtered band. For example, the filtering portions may transmit less than 40% of the light in a desired band for filtering. In some embodiments, the filtering portions transmit less than 25% or less than 10% of light in the filtered band. The non-filtering portions 215 may not fully transmit light in the filtered band. For example, the non-filtering portions 215 transmit more than 50% of the light in a desired band for filtering. In other embodiments, the non-filtering portions 215 transmit more than 80% or more than 90% of light in the filtered band.

The ambient light 205 includes light in the second, non-visible band, such as infrared (IR) light, that is used for eye tracking and is filtered by the filtering portion of the patterned optical filter 210. The ambient light 205 may also include light in a visible band, light in an ultraviolet band, or other bands. Because the patterned optical filter 210 filters light in a non-visible band but does not filter light in a visible band, the patterned optical filter 210 is not visible to the user and does not disrupt the user's view of the area outside the eyewear device 100. The filtering portion of the patterned optical filter 210 blocks the ambient light 205 in the non-visible band used for eye tracking from passing through the optical element 110 and towards the eye 225. However, the non-filtering portions 215 of the patterned optical filter 210 allow ambient light 205 in the non-visible band to pass through as patterned light 220. The patterned light 220 is patterned based on the pattern formed by the non-filtering portions 215. This patterned light 220 illuminates the user's eye 225. As shown in FIG. 2A, the collimated ambient light 205 that passes through the non-filtering portions 215 remains collimated, so that the patterned light 220 passes through as streams of collimated light. This results in a structured pattern of dots formed on the user's eye, such as the pattern shown in FIG. 6A. If the ambient light 205 is not collimated (e.g., if the user is not facing a light source) and instead passes through the patterned optical filter 210 at various angles, the patterned light 220 may have a more diffuse structure (e.g., without clear boundaries in the dot pattern) or may be distributed uniformly across the area of the eye 225.

The eyewear device 100 includes an eye tracking system. The eye tracking system includes a camera 235 that captures images of the eye 225 that include reflections of the patterned light 220. When the patterned light 220 that is transmitted through the non-filtering portions 215 reaches the eye 225, the patterned light 220 produces a distorted illumination pattern on at least a portion of a surface of the eye that is captured by the camera 230. In the case of collimated light, as shown in FIG. 2A, the distortion is caused by the shape of the eye. If the ambient light 205 is not collimated, the distortion is caused by reflections from an iris of the eye that are refracted by the cornea, referred to as a "glint." Different algorithms can be used to determine the direction of the eye depending on the direction of the light, the resulting pattern on the eye, and the features that can be identified in the image of the eye.

The camera 235 is configured to capture images of light in the non-visible band that is transmitted by the non-filtering portions 215 but filtered by the patterned optical filter 210. For example, if the optical filter 210 filters light in the infrared band (~750 nm to 2500 nm) or some portion of the infrared band, the patterned light 220 that is passed through the patterned optical filter 210 can include light in this infrared band or this portion of the infrared band. Accordingly, the camera 235 is configured to capture images of the reflected patterned light, which is in this infrared band or portion of the infrared band. For example, the camera 235 can include a silicon-based infrared detector, which can detect infrared light at relatively short wavelengths, e.g., 400-900 nm; an indium gallium arsenide (InGaAs) based detector, which can detect light at longer wavelengths, e.g., 900-1500 nm; or a graphene detector, which can detect infrared light across a broad range of wavelengths. The detection technology can be selected for inclusion in the eyewear device 100 based on the ambient light profile in a region in which the eyewear device 100. In some embodiments, multiple types of infrared detectors are included in a single camera 235, or multiple cameras with different infrared technologies are included in the eyewear device 100. If multiple detectors are incorporated into the eyewear device 100, the detector used at any particular time can be selected based on the profile of the ambient light at the time of use. In some embodiments, the camera 235 is also sensitive to other bands of light, such as a visible band. In some embodiments, the camera 235 includes an infrared filter to increase the signal-to-noise ratio of the captured light. The camera 235 may be a camera of a camera assembly, described in greater detail below in relation to FIG. 5.

The eye tracking system further includes a controller (not shown in FIG. 2A), which receives images captured by the camera 235 and determines eye tracking information based on the images. The determined eye tracking information may comprise information about a position of the user's eye 225, e.g., a measurement of a point of gaze of the user (i.e., an eye position), the motion of the eye 225 of the user (i.e., eye movement), or both. In particular, the eye tracking system can use locations of the reflected structured light pattern generated by the patterned light 220 in a captured image to determine the eye position and eye-gaze. One or more algorithms may be used to determine eye tracking information based on the shape and behavior of the light, including the geometry of the incoming light (e.g., collimated or diffuse) and the aperture size of the non-filtering portions 215. The controller is described in greater detail with respect to FIG. 5, and eye tracking using structured light is described in greater detail with respect to FIGS. 6A and 6B.

For purposes of illustration, FIG. 2A shows the cross section associated with a single eye 225, a single optical element 110, and a single eye tracking system, but in some embodiments, another optical element 110 and another eye tracking system (including another camera 235) can be included for another eye 225 of the user. As shown in FIG. 2A, the camera 235 can be embedded in a lower portion of the frame 105. However, the camera 235 can be located in any portion of the frame, e.g., at the bottom, at an outer side, at an inner side, or in a corner. While only one camera 235 is shown in FIG. 2A, the eyewear device 100 may include multiple camera 235 per eye 225. For example, different camera 235 may be embedded in different parts of the frame 105. Using multiple camera 235 per eye 225 may increase the accuracy of the eye tracking, and provides redundancy in case a camera 235 breaks, becomes dirty, is blocked, or otherwise has diminished functionality.

In some embodiments, the eye tracking system also includes one or more light sources, such as the light source 240. The light source 240 is configured to emit light at a particular wavelength or within a particular band of wavelengths, which may be the same band that is filtered by the filtering portion of the patterned optical filter 210 and captured by the camera 235 for eye tracking. The light source 240 may be configured to emit light in a sub-division of a band, e.g., in the near-infrared band or in the short-wavelength infrared band. The light source 240 may be, for example, a laser diode (e.g., an edge emitter), an inorganic or organic LED, a vertical-cavity surface-emitting laser (VCSEL), or some other source. While one light source 240 is shown in FIG. 2A, the eyewear device 100 may include multiple similar light sources 240, which may be positioned at different locations within the frame 105. Using multiple light sources 240 provides more illumination than a single light source, and provides better coverage of the eye 225. For example, the eyewear device 100 may include a plurality of light sources 240 arranged in a ring around the optical element 110 to directly illuminate the cornea of the user's eye 225. As another example, one or more light sources 240 may be oriented to project light into the optical element 110, which the optical element 110 projects onto the eye 225 through holes in the optical element 110. In some embodiments, the holes in the optical element 110 emit structured light, which may be similar to the structured light generated by the patterned optical filter 210.

In one embodiment, the light source 240 is a backplane illumination panel that emits light (e.g., infrared light) that is transmitted through the patterned optical filter 210. The backplane illumination panel is transparent to visible light. The backplane illumination panel may emit infrared light that supplements the ambient light 205, e.g., if there is no ambient light 205, or not enough ambient light 205 to perform eye tracking. Alternatively, the backplane illumination panel or other type of light source 240 may be the sole source of infrared light, and ambient light 205 is not used for eye tracking.

A backplane illumination panel may include one or more light sources for emitting infrared light, which is reflected and diffused by a back reflector. The reflected infrared reflected light then passes through the patterned optical filter 210, forming the patterned light 220. The backplane illumination panel may be included in a waveguide display, such as any of the waveguide displays described with respect to FIG. 1. The backplane illumination panel may generate ambient light 205 as a uniform light source, or the light emitted by the backplane illumination panel may be focused in the location of the non-filtering portions 215 of the patterned optical filter 210.

Including the light source 240 or multiple light sources in the eyewear device 100 ensures that the camera 235 and eye tracking system can perform eye tracking even in conditions where there is low or no ambient light 205. The light source 240 may generate light when the level of ambient light in the second, non-visible band used for eye tracking is below some threshold level (e.g., 5 lux). In one embodiment, the level of ambient light 205 in the area of the eyewear device 100 is received or determined by a controller, e.g., based on the images captured by the camera 235 or a using separate light sensor included in the eyewear device 100. If the controller determines that the level of ambient light 205 is above a threshold, the light source 240 does not generate light, and the eye tracking is performed using only the patterned light 220. If the controller determines that the level of ambient light 205 is below the threshold, the controller instructs the light source 240 to generate light that can be used for eye tracking. In another embodiment, the level of ambient light 205 in the second, non-visible band is determined and used to decide whether to instruct the light source 240 to generate light. While in some cases, a high amount of ambient light generally corresponds to a high amount of infrared light (e.g., in a sunlight, or certain types artificial lighting), in other cases, a high amount of ambient visible light may not include a sufficient amount of infrared light for eye tracking. Thus, the controller may receive or determine the level of light in the second, non-visible band used for eye tracking (e.g., infrared light) in the ambient light 205 based on, e.g., the images captured by the camera 235 or a separate infrared sensor.

The light from the light source 240 may supplement the ambient light 205, or, if there is no patterned light, the light from the light source 240 is used instead of patterned light 220 supplied by the ambient light 205. In other embodiments, the eyewear device 100 does not include a light source 240, and the eyewear device 100 may not perform eye tracking when the level of ambient light 205 is insufficient. For example, the eyewear device 100 may be intended only for daytime, outdoor use, when the level of ambient infrared light is sufficiently high.

Figure 2B:
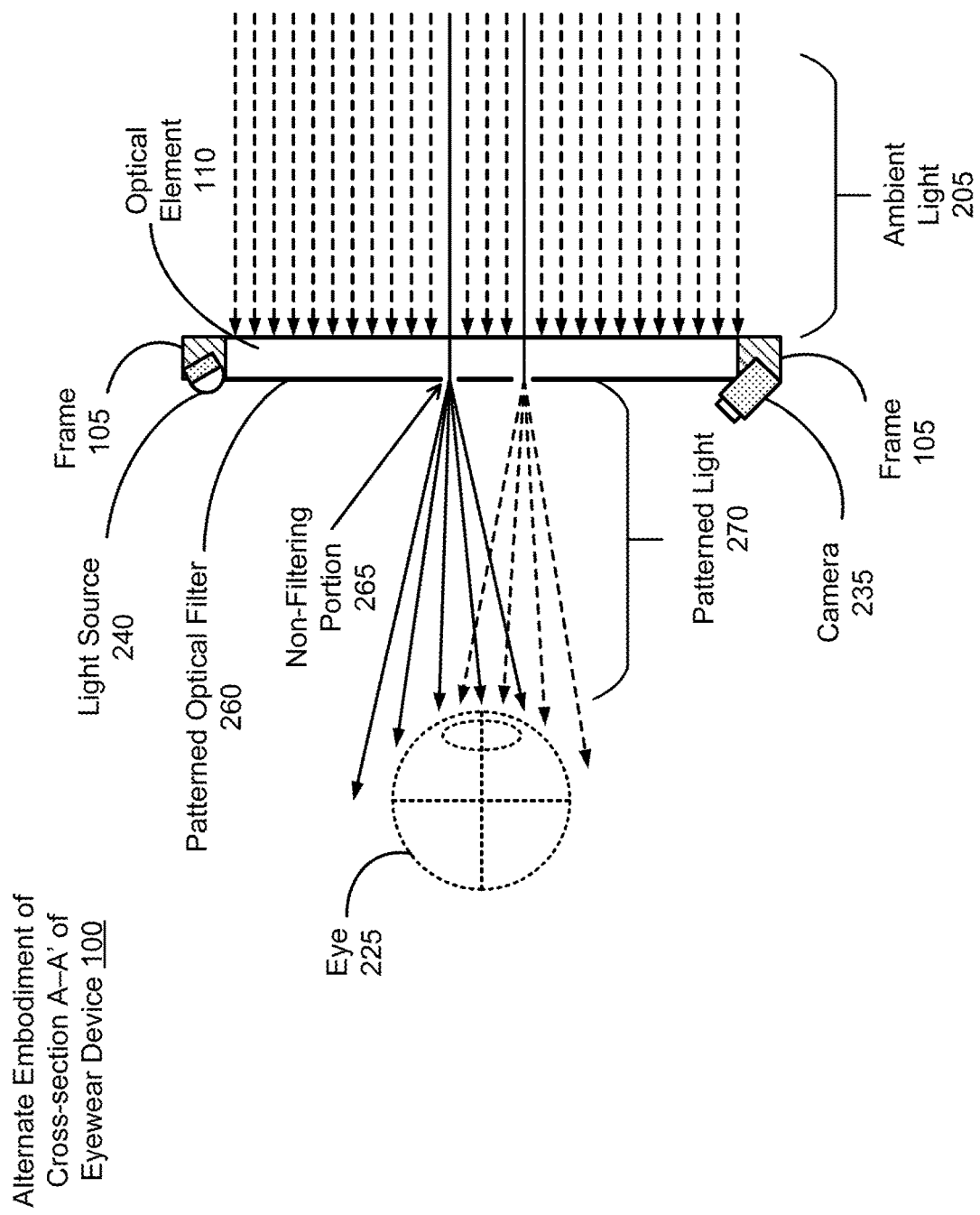
FIG. 2B is an alternate cross section of the eyewear device of FIG. 1 with an optical filter for projecting a second pattern, in accordance with an embodiment.

FIG. 2B is an alternate cross section of the eyewear device of FIG. 1 with an optical filter for projecting a second pattern, in accordance with an embodiment. In the embodiment shown in FIG. 2B, the patterned optical filter 260 with non-filtering portions 265 results in patterned light 270 having a different pattern from the patterned optical filter 210 with non-filtering portions 215 shown in FIG. 2A. In particular, the non-filtering portions 265 are small apertures that cause the ambient light 205 to diffract, so that the light exiting each non-filtering portion 265 acts as a point source or an angular portion of a point source. The angle of the light exiting the aperture is related to the diameter of the aperture and the wavelength of the light, with a smaller aperture creating a wider angle of light. For infrared light, if the size of the aperture is on the order of 10 μm or larger, the diffraction effect will likely be negligible. If the size of the aperture is on the order of 1 μm or smaller, the diffraction effect results in the patterned light 270 behaving as light from a point source.

As shown in FIG. 2B, two non-filtering portions 265 create two point sources directed at the eye 225, and the light exiting these non-filtering portions 265 overlap at least partially. Additional non-filtering portions 265 can be included to produce a light pattern 270 that fully covers the eye 225. This uniform patterned light 270 can be used by eye tracking algorithms that track the location of the cornea based on detecting a glint. Because the patterned light 270 comes from multiple "sources" (here, multiple non-filtering portions 265), in some cases, the image captured by the camera 235 will include multiple glints from different non-filtering portions 265. Identifying multiple glints and correlating the glints to their respective non-filtering portions 265 can increase the accuracy of the eye tracking.

In some embodiments, a patterned optical filter includes both the large-aperture non-filtering portions 215 shown in FIG. 2A, and the small-aperture non-filtering portions 265 shown in FIG. 2A. In this embodiment, the large-aperture non-filtering portions 215 can provide structured patterned light 220 (e.g., a pattern of dots across the eye 225), while the small-aperture non-filtering portions 265 act as a point sources creating uniform patterned light 270. The controller can perform algorithms for eye tracking using both types of patterned light 220 and 270. In some embodiments, the non-filtering portions 215 and 265 can be configured to partially filter light in different bands. As an example, the large aperture non-filtering portions 215 filter light in the 700 nm-900 nm wavelength range, while the small aperture non-filtering portions 265 filter light in the 1000 nm-1400 nm range. In this example, the light from the different non-filtering portions 215 and 265 can be distinguished from each other based on wavelength. For example, the light from the small-aperture non-filtering portions 265, which includes the lower range of wavelengths, can be detected using a silicon-based infrared detector, while the light from the large-aperture non-filtering portions 215, which includes the higher range of wavelengths, can be detected using an indium gallium arsenide (InGaAs) based detector.

FIG. 3A is a front view of an optical element 300 with a patterned optical filter on a portion of the optical element 300, in accordance with an embodiment. The optical element 300 may be a lens and/or display, as described above with respect to FIG. 1. The optical element 300 has a patterned area 305 located around a center of the optical element 300. In other embodiments, the location of the patterned area 305 can be adjusted based on the geometry of the eyewear device and/or the facial geometry of the user. The patterned area 305 includes a filtering portion 310 and a set of non-filtering portions 315, shown as a pattern of dots across the patterned area 305 in FIG. 3A. As described with respect to FIG. 2A, the filtering portion 310 of the patterned area 305 is an optical filter that transmits light in at least one band (e.g., a visible band of light) and filters light in at least one different band (e.g., an infrared band of light), while the non-filtering portions 315 transmit light in both bands.

Having the patterned area 305 cover a portion of the optical element 300 may be suitable for a relatively large optical element 300 that covers the eye and an area around the eye. For example, the patterned area 305 may extend across a 15 mm×15 mm area of the optical element 300 and arranged to cause patterned light to reflect off a similarly-sized area that includes the user's cornea. The non-filtering portions 315 may be a 30×30 grid of dots that are spaced 0.5 mm apart from each other. In other embodiments, rather than evenly spaced dots, the non-filtering portions 315 may be patterned by unevenly spaced dots or unevenly shaped dots, as shown in FIG. 6B. In other embodiments, the dots may be arranged in other shapes, e.g., as a circle, ellipse, or square, or concentrically arranged geometric shapes (e.g., concentric circles). The non-filtering portions 315 may be a series of evenly spaced dots (e.g., 0.5 mm apart), unevenly spaced and/or sized dots, parallel lines, or the non-filtering portions 315 may have some other geometry. For example, the non-filtering portions 315 may be ovals, rectangles, elongated shapes, or other more complex shapes. The region of the optical element 300 that is outside the patterned area 305 may be an unpatterned optical filter to screen out light in the band used for eye tracking (e.g., the infrared band) from the area around the user's eye to prevent this infrared light from interfering with the formation of the pattern on the eye.

FIG. 3B is a front view of an optical element 320 with a patterned optical filter across the full optical element 320, in accordance with an embodiment. The optical element 320 may be a lens and/or display, as described above with respect to FIG. 1. The entire optical element 320 has a patterned optical filter with non-filtering portions 335 forming a pattern across the optical element 320. As described with respect to FIG. 2A, the filtering portion 330 is an optical filter that transmits light in at least one band (e.g., a visible band of light) and filters light in at least one different band (e.g., an infrared band of light), while the non-filtering portions 335 transmit light in both bands. The non-filtering portions 335 may be a series of evenly spaced dots (e.g., 0.5 mm apart), unevenly spaced and/or sized dots, parallel lines, or the non-filtering portions 335 may have some other geometry. For example, the non-filtering portions 335 may be ovals, rectangles, elongated shapes, or other more complex shapes.

An optical filter with non-filtering portions 335 that extend across the full optical element 320 may be suitable for relatively small optical elements 320 that do not cover a wide area around the eye. In addition, extending the pattern across the full optical element 320 may be suitable for optical elements 320 designed for use across different facial geometries. Depending on the wearer, the location of the eye behind the optical element 320 may vary, and extending the pattern across the optical element 320 helps ensure that if a user's eye is positioned anywhere behind the optical element 320, patterned light will reach the user's eye.

While FIGS. 3A and 3B show a patterned optical filter with non-filtering portions 315 and 335 forming a pattern, in other embodiments, the filtering and non-filtering portions are reversed, such that multiple filtering portions (e.g., dots of dichroic material) form a pattern in a non-filtering portion.

FIG. 4A is a cross section of an optical element 410 with a surface patterned optical filter, in accordance with an embodiment. The optical element 410 is fitted in a frame 405. The optical element 410 and frame 405 may be similar to the optical element 110 and frame 105 described with respect to FIGS. 1 and 2. For example, the optical element 410 may include a lens, such as a prescription lens or an ultraviolet lens. A patterned optical filter 415 is coupled to a surface of the optical element 410. The patterned optical filter 415 is an optical filter with a section of non-filtering portions near the center of the optical element 410, similar to the patterned optical filter shown in FIG. 3A. The patterned optical filter 415 may be on the surface closer to the user's eye, as shown in FIGS. 2A and 2B, or may be on the opposite surface.

FIG. 4B is a cross section of an optical element that includes a waveguide display and a patterned optical filter, in accordance with an embodiment. A frame 425 holds an optical element that is made up of a waveguide display 430, a patterned optical filter 435 coupled to the waveguide display 430, and a coating 440 on the other side of the patterned optical filter 435 from the waveguide display 430. The coating 440 may form a smooth surface to the optical element (e.g., if the patterned optical filter 435 is not smooth because of the holes forming the non-filtering portions) and protect the patterned optical filter 435 from damage. The waveguide display 430 directs one or more images to an eye of the user. The images displayed by the waveguide display 430 may be generated or adjusted based on a gaze point of the user detected by the eye tracking system. The waveguide display 430 may include, e.g., a stacked waveguide display, stacked waveguide and powered optical elements, a varifocal waveguide display, or some combination thereof. Additional options for the waveguide display 430 are described with respect to FIG. 1. As described with respect to FIG. 2A, the waveguide display 430 may emit light that supplements the ambient light 205 and is used for eye tracking.

FIG. 4C is a cross section of an optical element with a waveguide display and a patterned optical filter, in accordance with an embodiment. A frame 445 holds an optical element that is made up of a waveguide display 450, a patterned optical filter 455 coupled to the waveguide display 455, and two coatings 460 and 465 on the two outer surfaces of the optical element to protect the waveguide display 450 and the patterned optical filter 455. The patterned optical filter 455 is on the opposite side of the waveguide display 450 compared to the patterned optical filter 435 and waveguide display 430 in FIG. 4B. Either or both coatings 460 and 465 may perform additional filtering, magnification, or other functions. In addition, additional layers can be included in the optical element of FIG. 4A, 4B, or 4C, such as additional waveguides, lenses, or other features.

Figure 5:
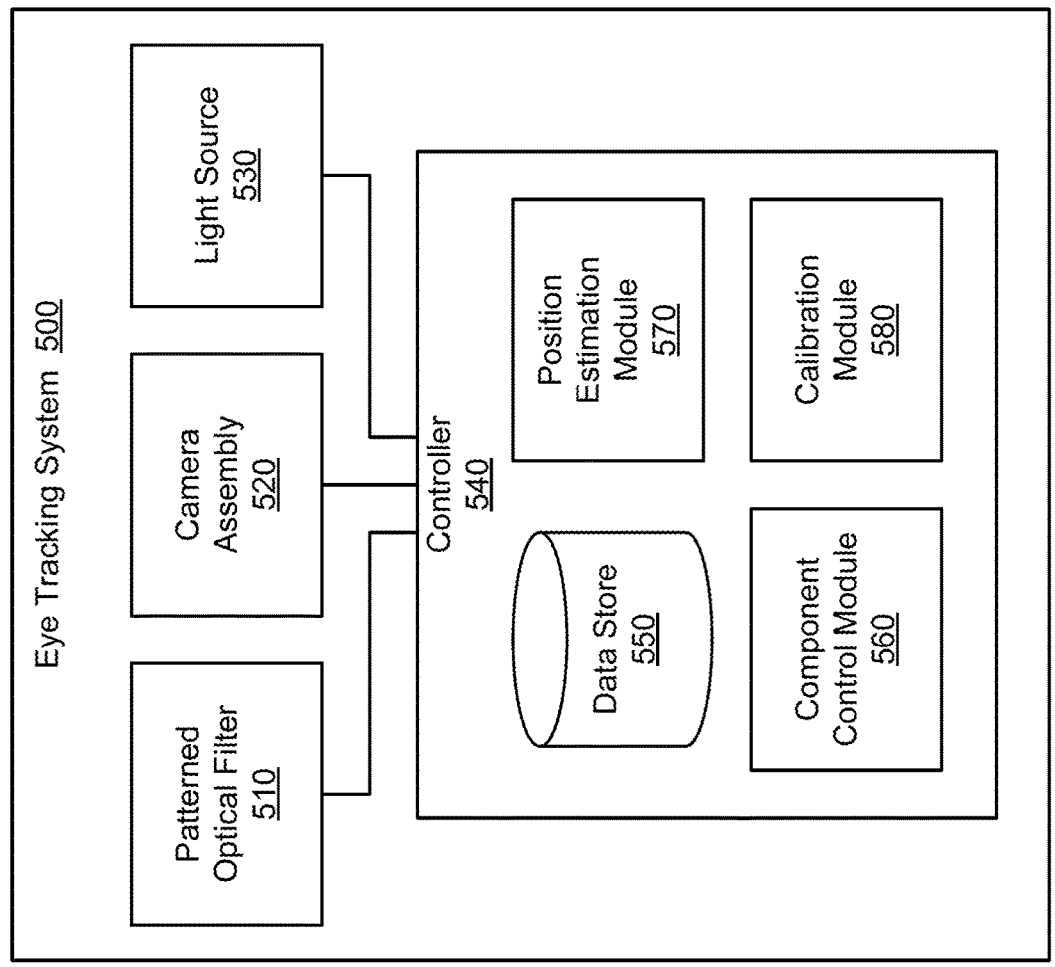
FIG. 5 is a block diagram of an eye tracking system, in accordance with an embodiment.

FIG. 5 is a block diagram of an eye tracking system 500 in accordance with an embodiment. The eye tracking system 500 may be used by the eyewear device 100 shown in FIGS. 1 and 2. The eye tracking system 500 includes a patterned optical filter 510, a camera assembly 520, a light source 530, and a controller 540. In other embodiments, the eye tracking system 500 includes additional or fewer modules than those described herein. Similarly, the functions can be distributed among the modules and/or different entities in a different manner than is described here.

Ambient light in the area of the eyewear device illuminates a portion of an eye 225 within a target area with a light pattern created by the patterned optical filter 510. The patterned optical filter 510 may be similar to any of the patterned optical filter with non-filtering portions described with respect to FIGS. 2A, 2B, 3A, and 3B.

The camera assembly 520 captures images of the light pattern reflected from the target area, which includes the eye 225. The camera 235 in FIGS. 2A and 2B are embodiments of the camera assembly 520. The reflected light includes, e.g., reflections of the light pattern from portions of the eye in the target area (e.g., cornea, iris, and/or sclera). The camera assembly 520 includes one or more cameras. A camera may be, e.g., an array (1D or 2D) of photodiodes, a charge coupled display (CCD) array, some other device capable of detecting some or all of the light pattern, or some combination thereof. The camera assembly 520 captures the images in accordance with tracking instructions generated by the controller 540.

The camera assembly 540 may adjust one or more imaging parameters in accordance with the tracking instructions. An imaging parameter is a parameter that affects how the camera assembly 540 captures images. An imaging parameter may include, e.g., frame rate, aperture, gain, exposure length, frame timing, some other parameter that affects how the camera assembly 540 captures images, or some combination thereof.

As discussed above with regard to FIG. 2A, in some embodiments, the eye tracking system 500 also includes one or more light sources 530 that can be used when the controller 540 determines that the level of ambient light in the second band used for eye tracking in the area of the eyewear device is too low for the controller 540 to perform eye tracking. The light source 530 may emit light in the visible band, in the infrared (IR) band (~750 nm to 2500 nm), in the ultraviolet band (10 nm to 380 nm), some other portion of the electromagnetic spectrum, or some combination thereof. The light source 530 emits light having wavelengths or in a band that the camera assembly 520 is sensitive to. The light source may be, e.g., a light emitted diode (LED), a micro LED, a laser diode, a tunable laser, a backplane illumination panel, etc. However, it is preferable to emit in the infrared band such that the source light is not visible to the user. The light source 530 or multiple light sources may emit structured light or unstructured light, and as described with respect to FIG. 2A, in some embodiments emits light through the patterned optical filter 510.

The controller 540 controls components of the eye tracking system 500. The controller 540 comprises a data store 550, a component control module 560, a position estimation module 570, and a calibration module 580. In other embodiments, the controller 540 comprises additional or fewer modules than those described herein. Similarly, the functions can be distributed among the modules and/or different entities in a different manner than is described here.

The data store 550 is a memory that stores information for the eye tracking system 500. The stored information may include, e.g., tracking instructions, emission parameters for the light sources 530, parameters of the patterned optical filter 510, imaging parameters, a model (M) of a user's eye, eye tracking information, images captured by the camera assembly 550, some other information that is used by the eye tracking system 500, or some combination thereof. The data store 550 is a memory, such as a read only memory (ROM), dynamic random access memory (DRAM), static random access memory (SRAM), or some combination thereof. The data store 550 may be part of a larger digital memory of an AR or VR system. The model, M, stored in the data store 550 can be a 3D model of a portion of the eye. The portion of the eye may include, e.g., a cornea, an iris, a pupil, a sclera, an anterior chamber, some other portion of the eye, or some combination thereof. The model M describes a geometry of the portion of the eye, and other aspects of the portion of the eye. For example, the model M can also describe indices of refractions for some portions of the eye (e.g., the cornea, the anterior chamber, etc.) as well as air. Additionally, M may also include acceleration vectors and/or velocity vectors for the eye that describe movement of the eye. In embodiments in which both of a user's eyes are scanned, the data store 550 may contain two model's $M_1$ and $M_2$: one for each eye. The model M describes a position of the eye with six degrees of freedom, accordingly, the model M also describes an orientation of the eye. Additionally, in some embodiments, the model M may include a position of the iris relative to the cornea of the eye.

In some embodiments, the model, M may include of a number of parameters which approximately specify a shape of the eye. For example, these parameters could correspond to an average radius of the eye, an average radius of the sclera of the eye, a set of three parameters to approximate the shape of the sclera as a ellipsoid, a radius of the cornea of the eye, a measurement of the protrusion of the cornea from the sclera, a set of parameters specifying the shape of the cornea, and a point of rotation for the eye. Additional parameters may be used to account for deviations from the ideal model specified by the parameters. For example, a bulge on the eye's surface caused by a blood vessel may be accounted for in M via these additional parameters.

The component control module 560 generates tracking instructions. The tracking instructions control the camera assembly 520 and any light sources 530, if included. The component control module 560 configures the camera assembly 520 to captures images such that images include some or all of the light pattern reflected off a surface of the eye. The component control module 560 may determine one or more imaging parameters and emission parameters of any operating light sources 530 to, e.g., to increase signal-to-noise ratio of the reflected light pattern in the captured images. Moreover, the component control module 560 can determine one or more emission parameters of the light sources 530 to ensure that the power of the emitted light is within eye safety thresholds. The component control module 560 generates the tracking instructions using the imaging parameters and any emission parameters. The component control module 560 provides the tracking instructions to the camera assembly 520 and/or the light sources 530.

The position estimation module 570 determines a position of one or both eyes of the user using one or more images from the camera assembly 520. The position estimation module 570 generates an estimate of the position of the eye based on a model, M from the data store 550 and the one or more images captured by the camera assembly 520. The position estimation module 570 is a software module implemented on one or more processors, a dedicated hardware unit, or some combination thereof.

In some embodiments, the position estimation module 570 generates a 3D approximation of a surface of the eye corresponding to the area of the eye illuminated by the patterned light that passes through the patterned optical filter 510. As discussed in detail below with regard to FIG. 6B, a structured light pattern includes a plurality of features that are uniquely identifiable. The position estimation module 570 uses the known structure of the projected structured light and the model M to determine a distortion of the light caused by the shape of the eye's surface (and to some extent reflections from the iris). From the distortion, the eye orientation estimation module 570 attributes depth information to different portions of the image. Using the depth information the position estimation module 570 updates a 3D approximation of a portion of the eye. The position estimation module 570 may use the depth information to determine eye tracking information. Eye tracking information can include, e.g., position of an eye, gaze angle, inter-pupillary distance, etc.

In some eye tracking systems, a location of the pupil is first estimated, and a pupillary axis is inferred based on the estimated location of the pupil, and then some offset is applied to determine the foveal axis (i.e., the gaze direction). By contrast, if the patterned optical filter 510 generates a large number of structured light features in the images of the eye, the position estimation module 570 can determine a gaze angle directly from the captured images and the model without computing a pupil location.

The calibration module 580 generates or trains the model M prior to eye tracking during a calibration sequence. The calibration module 580 is a software module implemented on one or more processors, a dedicated hardware unit, or some combination thereof. The calibration sequence implemented by the calibration module 580 may involve having the camera assembly 520 capture images of the structured light pattern reflected from the eye as it looks at known locations. In one embodiment, the user is instructed to look at a certain object (e.g., a virtual icon) that is displayed on an electronic display (e.g., of the eyewear device 100). The camera assembly 520 captures an image of the structured light pattern reflected from the eye while the user is looking at the object. The location of the object can be displayed at different locations, such that the eye tracking system 500 can capture images of the eye at multiple known orientations. The images of the structured light pattern can be interpolated into a model, M which is stored in the data store 550. Once the calibration module 580 has produced M, eye tracking may begin. In general, eye tracking with a model, M, trained for a specific user's eye is more accurate than eye tracking without such a model. In some embodiments, the calibration module 580 continues to update M during tracking. In some embodiments, the system may begin tracking with a nominal model M based on statistical norms of human eyes and the calibration module 580 updates M during tracking.

Figure 6A:
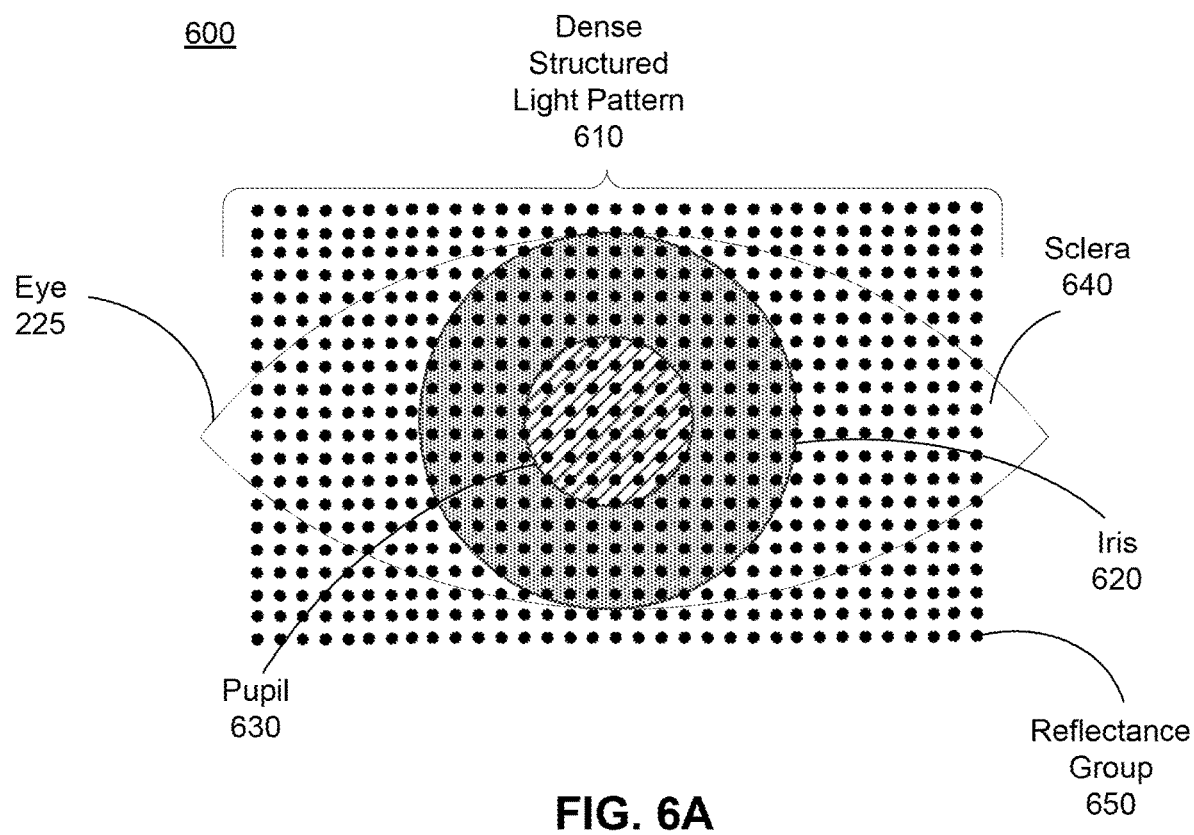
FIG. 6A shows an example of a structured light pattern projected onto an eye, according to an embodiment.
Figure 6B:
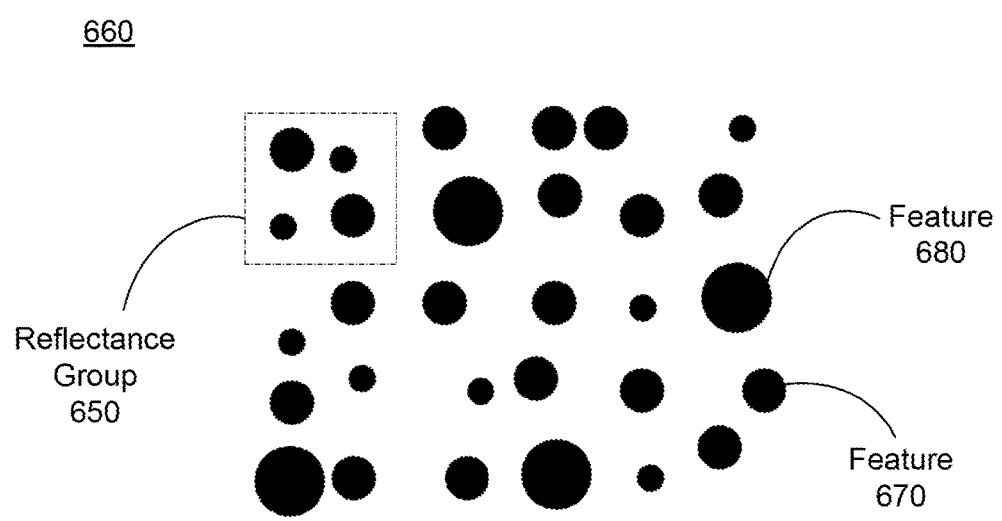
FIG. 6B shows an example of a portion of a structured light pattern, according to an embodiment.

FIG. 6A shows an example structured light pattern 610 projected onto an eye 225, according to an embodiment. In this example, the structured light pattern 610 is a pattern of a reflectance groups (e.g., dots) projected onto a target area that includes the eye 225. The structured light pattern 610 is generated by ambient light passing through a patterned optical filter, as described with respect to FIGS. 1-3. In this embodiment, the structured light pattern 610 fills the target area, and the target area includes a cornea of the eye 225 (not illustrated), an iris 620 of the eye 225, a pupil 630 of the eye 225, and some of a sclera 640 of the eye 225.

In this embodiment, the structured light pattern 610 is an array of reflectance groups 650. Note that the reflectance groups 650 may include one or more structured light features of different sizes, shapes, and locations than shown in FIG. 6A. Additionally, in alternate embodiments the structured light pattern 610 is projected onto larger or smaller target areas than what is shown in FIG. 6A, using a larger or smaller patterned area. For example, the patterned area may be roughly the size of the iris 620.

FIG. 6B shows an example of a portion 660 of the structured light pattern 610, according to an embodiment. In this embodiments, the portion 660 of the structured light pattern 610 is divided into a plurality of reflectance groups 650. In this example, some of the features 650 have different configurations, specifically, feature size. Each reflectance group 650 includes a unique group of adjacent holes.

In some embodiments, one or more structured light features form a reflectance group 650. A reflectance group 650 uniquely identifies its location within the structure light pattern 610 based upon its configuration. Configuration may include, e.g., feature shape, feature size, spatial configuration, or some combination thereof. Feature shape refers to a shape of the feature (e.g., dot, line, etc.). Feature size refers to a physical size of a feature. For example, feature 670 is smaller than feature 680. Spatial configuration refers to respective locations of structured light features relative to one another in a reflectance group.

Figure 7:
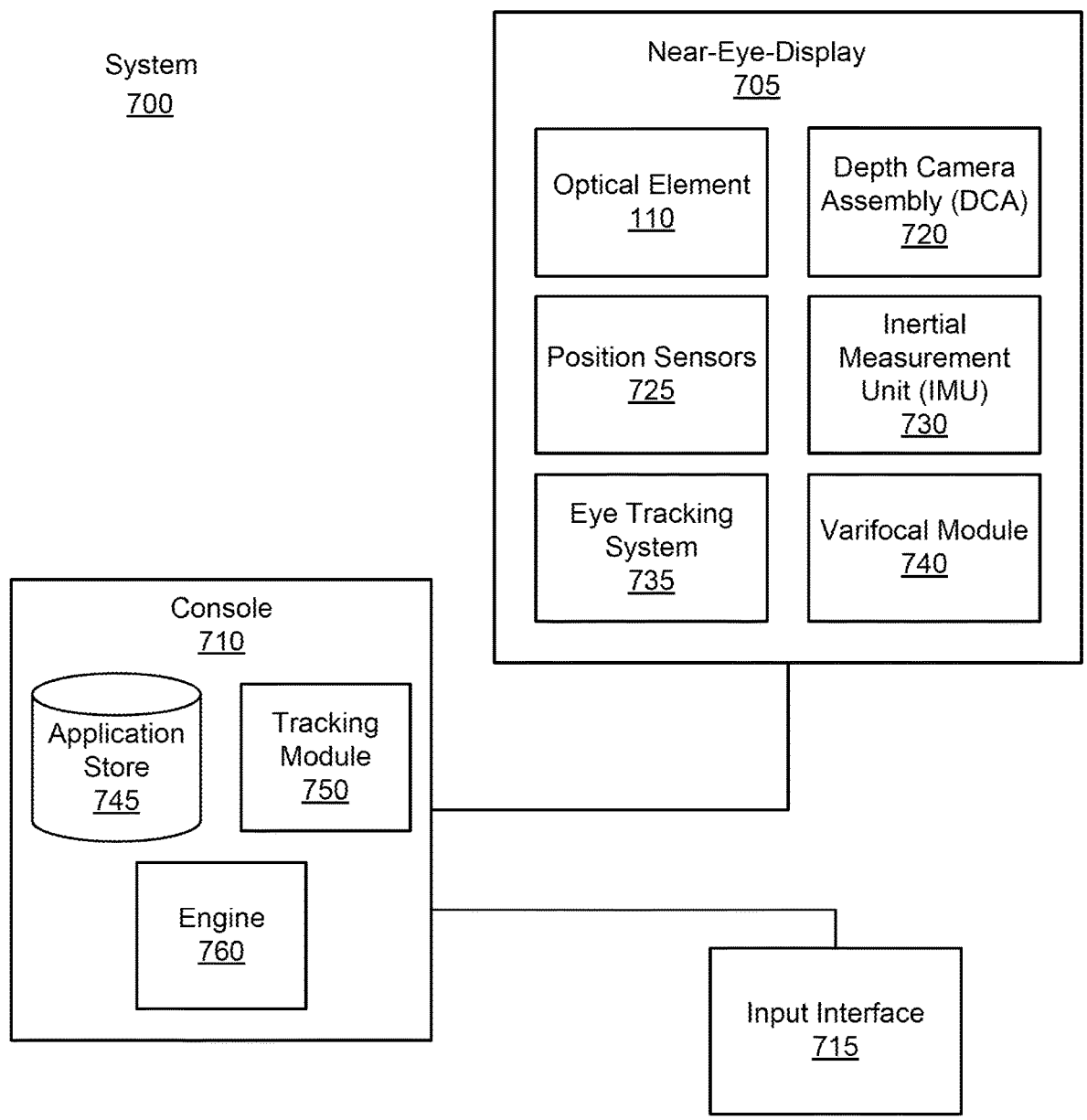
FIG. 7 is a block diagram of a near-eye artificial reality system, in accordance with an embodiment.

FIG. 7 is a block diagram of a near-eye-display system 700 with an eye tracker, in accordance with an embodiment. The near-eye-display system 700 may operate in an artificial reality system environment. The near-eye-display system 700 shown by FIG. 7 comprises a near-eye-display 705 and an input/output (I/O) interface 715 that are coupled to the console 710. While FIG. 7 shows an example near-eye-display system 700 including one near-eye-display 705 and one I/O interface 715, in other embodiments any number of these components may be included in the near-eye-display system 700. For example, there may be multiple near-eye-displays 705 each having an associated I/O interface 715, with each near-eye-display 705 and I/O interface 715 communicating with the console 710. In alternative configurations, different and/or additional components may be included in the near-eye-display system 700. Additionally, functionality described in conjunction with one or more of the components shown in FIG. 7 may be distributed among the components in a different manner than described in conjunction with FIG. 7 in some embodiments. For example, some or all of the functionality of the console 710 is provided by the near-eye-display 705.

The near-eye-display 705 presents content to a user. The content can include artificial views of a physical, real-world environment with computer-generated elements (e.g., two-dimensional (2D) or three-dimensional (3D) images, 2D or 3D video, sound, etc.). In some embodiments, the near-eye-display 705 is the eyewear device 100. Examples of content presented by the near-eye-display 705 include one or more images, video, audio, text, or some combination thereof. In some embodiments, audio is presented via an external device (e.g., speakers and/or headphones) that receives audio information from the near-eye-display 705, the console 710, or both, and presents audio data based on the audio information. In some embodiments, the near-eye-display 705 may present artificial reality content to a user. In some embodiments, the near-eye-display 705 may augment views of a physical, real-world environment with computer-generated elements (e.g., images, video, sound, etc.).

The near-eye-display 705 includes an optical element 110 for each eye, a depth camera assembly (DCA) 720, one or more position sensors 725, an inertial measurement unit (IMU) 730, an eye tracking system 735, and an optional varifocal module 740. Some embodiments of the near-eye-display 705 have different components than those described here. Additionally, the functionality provided by various components described in conjunction with FIG. 7 may be differently distributed among the components of the near-eye-display 705 in other embodiments.

The optical element 110 includes a patterned optical filter used to form patterned light that is reflected by a user's eye. The patterned optical filter is described in detail with respect to FIGS. 2A-6. The optical element may also include lenses, displays, filters, and any other elements described with respect to optical element 110 in relation to FIGS. 1 and 2A.

The DCA 720 captures data describing depth information of a local area surrounding some or all of the near-eye-display 705. The DCA 720 can compute the depth information using the data (e.g., based on a captured portion of a structured light pattern), or the DCA 720 can send this information to another device such as the console 710 that can determine the depth information using the data from the DCA 720.

The DCA 720 includes a light generator, an imaging device and a controller. The light generator of the DCA 720 is configured to illuminate the local area with illumination light in accordance with emission instructions. The imaging device of the DCA 720 includes a lens assembly, a filtering element and a detector. The lens assembly is configured to receive light from a local area surrounding the imaging device and to direct at least a portion of the received light to the detector. The filtering element may be placed in the imaging device within the lens assembly such that light is incident at a surface of the filtering element within a range of angles, wherein the range of angles is determined by a design range of angles at which the filtering element is designed to filter light. The detector is configured to capture one or more images of the local area including the filtered light. In some embodiments, the lens assembly generates collimated light using the received light, the collimated light composed of light rays substantially parallel to an optical axis. The surface of the filtering element is perpendicular to the optical axis, and the collimated light is incident on the surface of the filtering element. The filtering element may be configured to reduce an intensity of a portion of the collimated light to generate the filtered light. The controller of the DCA 720 generates the emission instructions and provides the emission instructions to the light generator. The controller of the DCA 720 further determines depth information for the one or more objects based in part on the captured one or more images.

The IMU 730 is an electronic device that generates data indicating a position of the near-eye-display 705 based on measurement signals received from one or more of the position sensors 725 and from depth information received from the DCA 720. A position sensor 725 generates one or more measurement signals in response to motion of the near-eye-display 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates data indicating an estimated current position of the near-eye-display 705 relative to an initial position of the near-eye-display 705. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals and calculates the estimated current position of the near-eye-display 705 from the sampled data. For example, the IMU 730 integrates the measurement signals received from the accelerometers over time to estimate a velocity vector and integrates the velocity vector over time to determine an estimated current position of a reference point on the near-eye-display 705. Alternatively, the IMU 730 provides the sampled measurement signals to the console 710, which interprets the data to reduce error. The reference point is a point that may be used to describe the position of the near-eye-display 705. The reference point may generally be defined as a point in space or a position related to the near-eye-display's 705 orientation and position.

The IMU 730 receives one or more parameters from the console 710. The one or more parameters are used to maintain tracking of the near-eye-display 705. Based on a received parameter, the IMU 730 may adjust one or more IMU parameters (e.g., sample rate). In some embodiments, certain parameters cause the IMU 730 to update an initial position of the reference point so it corresponds to a next position of the reference point. Updating the initial position of the reference point as the next calibrated position of the reference point helps reduce accumulated error associated with the current position estimated the IMU 730. The accumulated error, also referred to as drift error, causes the estimated position of the reference point to "drift" away from the actual position of the reference point over time. In some embodiments of the near-eye-display 705, the IMU 730 may be a dedicated hardware component. In other embodiments, the IMU 730 may be a software component implemented in one or more processors.

In some embodiments, the eye tracking system 735 is integrated into the near-eye-display 705. The eye tracking system 735 determines eye tracking information associated with an eye of a user wearing the near-eye-display 705. The eye tracking information determined by the eye tracking system 735 may comprise information about an orientation of the user's eye, i.e., information about an angle of an eye-gaze. The eye tracking system 735 may be an embodiment of the eye tracking system 500 in FIG. 5. An embodiment of the eye-tracking system 735 may comprise an illumination source and an imaging device (camera).

In some embodiments, the varifocal module 740 is further integrated into the near-eye-display 705. The varifocal module 740 may be coupled to the eye tracking system 735 to obtain eye tracking information determined by the eye tracking system 735. The varifocal module 740 may be configured to adjust focus of one or more images displayed on an electronic display of the optical element 110 (e.g., a waveguide display), based on the determined eye tracking information obtained from the eye tracking system 735. In this way, the varifocal module 740 can mitigate vergence-accommodation conflict in relation to image light. The varifocal module 740 can be interfaced (e.g., either mechanically or electrically) with the optical element 110. Then, the varifocal module 740 may be configured to adjust focus of the one or more images displayed on the electronic display 525 by adjusting position of the display of the optical element 110, based on the determined eye tracking information obtained from the eye tracking system 740. By adjusting the position, the varifocal module 740 varies focus of image light output from the optical element 110 towards the user's eye. The varifocal module 740 may be also configured to adjust resolution of the images displayed on the optical element 110 by performing foveated rendering of the displayed images, based at least in part on the determined eye tracking information obtained from the eye tracking system 740. In this case, the varifocal module 740 provides appropriate image signals to the optical element 110. The varifocal module 740 provides image signals with a maximum pixel density for the electronic display of the optical element 110 only in a foveal region of the user's eye-gaze, while providing image signals with lower pixel densities in other regions of the electronic display. In one embodiment, the varifocal module 740 may utilize the depth information obtained by the DCA 720 to, e.g., generate content for presentation on the electronic display of the optical element 110.

The I/O interface 715 is a device that allows a user to send action requests and receive responses from the console 710. An action request is a request to perform a particular action. For example, an action request may be an instruction to start or end capture of image or video data or an instruction to perform a particular action within an application. The I/O interface 715 may include one or more input devices. Example input devices include: a keyboard, a mouse, a game controller, or any other suitable device for receiving action requests and communicating the action requests to the console 710. An action request received by the I/O interface 715 is communicated to the console 710, which performs an action corresponding to the action request. In some embodiments, the I/O interface 715 includes an IMU 730 that captures calibration data indicating an estimated position of the I/O interface 715 relative to an initial position of the I/O interface 715. In some embodiments, the I/O interface 715 may provide haptic feedback to the user in accordance with instructions received from the console 710. For example, haptic feedback is provided when an action request is received, or the console 710 communicates instructions to the I/O interface 715 causing the I/O interface 715 to generate haptic feedback when the console 710 performs an action.

The console 710 provides content to the near-eye-display 705 for processing in accordance with information received from one or more of: the DCA 720, the near-eye-display 705, and the I/O interface 715. In the example shown in FIG. 7, the console 710 includes an application store 745, a tracking module 750, and an engine 760. Some embodiments of the console 710 have different modules or components than those described in conjunction with FIG. 7. Similarly, the functions further described below may be distributed among components of the console 710 in a different manner than described in conjunction with FIG. 7.

The application store 745 stores one or more applications for execution by the console 710. An application is a group of instructions, that when executed by a processor, generates content for presentation to the user. Content generated by an application may be in response to inputs received from the user via movement of the near-eye-display 705 or the I/O interface 715. Examples of applications include: gaming applications, conferencing applications, video playback applications, or other suitable applications.

The tracking module 750 calibrates the near-eye-display system 700 using one or more calibration parameters and may adjust one or more calibration parameters to reduce error in determination of the position of the near-eye-display 705 or of the I/O interface 715. For example, the tracking module 750 communicates a calibration parameter to the DCA 720 to adjust the focus of the DCA 720 to more accurately determine positions of structured light elements captured by the DCA 720. Calibration performed by the tracking module 750 also accounts for information received from the IMU 730 in the near-eye-display 705 and/or an IMU 730 included in the I/O interface 715. Additionally, if tracking of the near-eye-display 705 is lost (e.g., the DCA 720 loses line of sight of at least a threshold number of structured light elements), the tracking module 750 may re-calibrate some or all of the near-eye-display system 700.

The tracking module 750 tracks movements of the near-eye-display 705 or of the I/O interface 715 using information from the DCA 720, the one or more position sensors 725, the IMU 730 or some combination thereof. For example, the tracking module 750 determines a position of a reference point of the near-eye-display 705 in a mapping of a local area based on information from the near-eye-display 705. The tracking module 750 may also determine positions of the reference point of the near-eye-display 705 or a reference point of the I/O interface 715 using data indicating a position of the near-eye-display 705 from the IMU 730 or using data indicating a position of the I/O interface 715 from an IMU 730 included in the I/O interface 715, respectively. Additionally, in some embodiments, the tracking module 750 may use portions of data indicating a position or the near-eye-display 705 from the IMU 730 as well as representations of the local area from the DCA 720 to predict a future location of the near-eye-display 705. The tracking module 750 provides the estimated or predicted future position of the near-eye-display 705 or the I/O interface 715 to the engine 760.

The engine 760 generates a 3D mapping of the area surrounding some or all of the near-eye-display 705 (i.e., the "local area") based on information received from the near-eye-display 705. In some embodiments, the engine 760 determines depth information for the 3D mapping of the local area based on information received from the DCA 720 that is relevant for techniques used in computing depth. The engine 760 may calculate depth information using one or more techniques in computing depth from structured light. In various embodiments, the engine 760 uses the depth information to, e.g., update a model of the local area, and generate content based in part on the updated model.

The engine 760 also executes applications within the near-eye-display system 700 and receives position information, acceleration information, velocity information, predicted future positions, or some combination thereof, of the near-eye-display 705 from the tracking module 750. Based on the received information, the engine 760 determines content to provide to the near-eye-display 705 for presentation to the user. For example, if the received information indicates that the user has looked to the left, the engine 760 generates content for the near-eye-display 705 that mirrors the user's movement in a virtual environment or in an environment augmenting the local area with additional content. Additionally, the engine 760 performs an action within an application executing on the console 710 in response to an action request received from the I/O interface 715 and provides feedback to the user that the action was performed. The provided feedback may be visual or audible feedback via the near-eye-display 705 or haptic feedback via the I/O interface 715.

In some embodiments, based on the eye tracking information (e.g., orientation of the user's eye) received from the eye tracking system 735, the engine 760 determines resolution of the content provided to the near-eye-display 705 for presentation to the user on the electronic display of the optical element 110. The engine 760 provides the content to the near-eye-display 705 having a maximum pixel resolution on the electronic display in a foveal region of the user's gaze, whereas the engine 760 provides a lower pixel resolution in other regions of the electronic display, thus achieving less power consumption at the near-eye-display 705 and saving computing cycles of the console 710 without compromising a visual experience of the user. In some embodiments, the engine 760 can further use the eye tracking information to adjust where objects are displayed on the optical element 110 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eyewear device comprising:
   an optical element that receives light including light in a visible band and light in an infrared (IR) band;
   a patterned optical filter disposed on the optical element, the patterned optical filter having a filtering portion and a plurality of non-filtering portions, the filtering portion is transmissive to light in the visible band and filtering of light in the IR band, and the plurality of non-filtering portions are transmissive to light in the visible band and transmissive to light in the IR band, wherein some portion of the received light in the IR band passes through the plurality of non-filtering portions and illuminates a portion of an eye of a user with a portion of a pattern formed by the portion of the received light in the IR band passing through the plurality of non-filtering portions; and
   a camera configured to capture one or more images of the portion of the eye illuminated with the portion of the pattern.

2. The eyewear device of claim 1, wherein the plurality of non-filtering portions comprises at least a first non-filtering portion and second non-filtering portion, and the first non-filtering portion is larger than the second non-filtering portion.

3. The eyewear device of claim 2, wherein the first non-filtering portion has a diameter of at least 10 μm, and the second non-filtering portion has a diameter no greater than 1 μm.

4. The eyewear device of claim 1, further comprising a controller configured to:
   receive the one or more captured images; and
   analyze the one or more captured images to estimate a position of the eye.

5. The eyewear device of claim 4 further comprising a display, wherein content presented by the display is based at least in part on the estimated position of the eye.

6. The eyewear device of claim 1, wherein the optical element is a waveguide display.

7. The eyewear device of claim 1, wherein the optical element includes a first surface and a second surface that is opposite the first surface and closer to the eye than the first surface, and the patterned optical filter is coupled to the first surface.

8. The eyewear device of claim 1, wherein the optical element includes a first surface and a second surface that is opposite the first surface and closer to the eye than the first surface, and the patterned optical filter is coupled to the second surface.

9. The eyewear device of claim 1, wherein the optical element includes a first surface and a second surface that is opposite the first surface and closer to the eye than the first surface, and the patterned optical filter is between the first surface and the second surface.

10. The eyewear device of claim 1, further comprising at least one light source that is configured to emit light in the IR band and illuminate at least a portion of the eye, wherein the received light comprises light from the at least one light source.

11. The eyewear device of claim 10, further comprising a controller configured to:
    determine a level of ambient light in the IR band using the one or more captured images;
    compare the level of ambient light in the IR band to a threshold level; and
    in response to determining that the level of ambient light in the IR band is below the threshold level, instructing the at least one light source to emit light in the IR band.

12. The eyewear device of claim 1, wherein the received light comprises ambient light from a local area of the eyewear device.

13. The eyewear device of claim 1, wherein each non-filtering portion of the plurality of non-filtering portions is positioned at a distance of no more than 0.5 mm away from an adjacent non-filtering portion.

14. The eyewear device of claim 1, wherein at least a first subset of the plurality of non-filtering portions are configured to diffract the light in the IR band.

15. An eyewear device comprising:
- an optical element that receives light including light in a first band and light in a second band;
- a patterned optical filter disposed on the optical element, the patterned optical filter having a filtering portion and a plurality of non-filtering portions, the filtering portion is transmissive to light in the first band and filtering of light in the second band, and the plurality of non-filtering portions are transmissive to light in the first band and transmissive to light in the second band, wherein some portion of the received light in the second band passes through the plurality of non-filtering portions and illuminates a portion of an eye of a user with a portion of a pattern formed by the portion of the received light in the second band passing through the plurality of non-filtering portions; and
- a camera configured to capture one or more images of the portion of the eye illuminated with the portion of the pattern.

16. The eyewear device of claim 15, wherein the plurality of non-filtering portions comprises at least a first non-filtering portion and second non-filtering portion, and the first non-filtering portion is larger than the second non-filtering portion.

17. The eyewear device of claim 16, wherein the first non-filtering portion has a diameter of at least 10 µm, and the second non-filtering portion has a diameter no greater than 1 µm.

18. The eyewear device of claim 15, wherein the optical element is a waveguide display.

19. The eyewear device of claim 15, wherein the optical element includes a first surface and a second surface that is opposite the first surface and closer to the eye than the first surface, and the patterned optical filter is coupled to the first surface.

20. The eyewear device of claim 15, wherein the optical element includes a first surface and a second surface that is opposite the first surface and closer to the eye than the first surface, and the patterned optical filter is coupled to the second surface.

21. The eyewear device of claim 15, wherein the optical element includes a first surface and a second surface that is opposite the first surface and closer to the eye than the first surface, and the patterned optical filter is between the first surface and the second surface.

22. The eyewear device of claim 15, further comprising at least one light source that is configured to emit light in the IR band and illuminate at least a portion of the eye, wherein the received light comprises light from the at least one light source.

23. A method for eye tracking comprising:
- receiving, at a camera, an image of a portion of an eye illuminated by ambient light in a band of wavelengths, the ambient light having a pattern formed by a patterned optical filter disposed on an optical element, the patterned optical filter having a filtering portion filtering light in the band and a plurality of non-filtering portions transmitting light in the band; and
- determining a position of the eye based on the image of the portion of the eye illuminated by the ambient light having the pattern.

* * * * *